(12) United States Patent
Béliveau

(10) Patent No.: US 6,668,503 B2
(45) Date of Patent: Dec. 30, 2003

(54) CONCRETE WALL FORM AND CONNECTORS THEREFOR

(75) Inventor: Jean-Louis Béliveau, Québec (CA)

(73) Assignee: Polyform A.G.P. Inc., Granby (CA)

(*) Notice: Subject to any disclaimer, the term of this patent is extended or adjusted under 35 U.S.C. 154(b) by 0 days.

(21) Appl. No.: 10/097,585

(22) Filed: Mar. 15, 2002

(65) Prior Publication Data

US 2002/0092253 A1 Jul. 18, 2002

Related U.S. Application Data

(63) Continuation-in-part of application No. 09/518,630, filed on Mar. 3, 2000, which is a continuation-in-part of application No. 09/293,152, filed on Apr. 16, 1999, now Pat. No. 6,230,462.

(51) Int. Cl.[7] .............................. E04B 2/28; E04B 2/86; E04G 11/06; E04G 17/02
(52) U.S. Cl. ........................................ 52/426; 52/442
(58) Field of Search ...................... 52/426, 442, 592.6, 52/71, 309.12, 309.17, 591.2, 713, 425, 592.5; 249/216; 11/190

(56) References Cited

U.S. PATENT DOCUMENTS

| | | | | |
|---|---|---|---|---|
| 4,730,422 A | | 3/1988 | Young | 52/105 |
| 4,731,968 A | * | 3/1988 | Obino | 52/309.12 |
| 5,065,561 A | | 11/1991 | Mason | 52/309.12 |
| 5,459,971 A | | 10/1995 | Sparkman | 52/416 |
| 5,598,675 A | | 2/1997 | Pruss | 52/309.4 |
| 5,625,989 A | | 5/1997 | Brubaker et al. | 52/309.12 |
| 5,657,600 A | | 8/1997 | Mensen | 52/426 |
| 5,701,710 A | | 12/1997 | Tremelling | 52/426 |
| 5,704,180 A | | 1/1998 | Boeck | 52/426 |
| 5,709,060 A | | 1/1998 | Vaughan et al. | 52/426 |
| 5,740,648 A | | 4/1998 | Piccone | 52/426 |
| 5,896,714 A | * | 4/1999 | Cymbala et al. | 52/426 |
| 5,992,114 A | * | 11/1999 | Zelinsky et al. | 52/426 |
| 6,230,462 B1 | * | 5/2001 | Beliveau | 52/426 |
| 6,314,694 B1 | * | 11/2001 | Cooper et al. | 52/309.12 |
| 6,401,419 B1 | * | 6/2002 | Beliveau | 52/592.6 |
| 6,438,918 B2 | * | 8/2002 | Moore et al. | 52/426 |

* cited by examiner

Primary Examiner—Jeanette Chapman
(74) Attorney, Agent, or Firm—Robic (57) ABSTRACT

A connector for tying together opposed foam panels in spaced and parallel relationship to make a form for receiving flowable material is disclosed. The connector comprises a pair of anchor members, one being devised to be embedded in one of the foam panels and the other being devised to be embedded in the other one of the foam panels. Each of these anchor members has a projecting end devised to come out of the foam panel once the anchor member is embedded therein. The connector further comprises a web member extending between the foam panels. The web member has opposite longitudinal side ends, each of the side ends being hingedly connectable to the projecting end of either one of the anchor members. Thanks to such a connector, the tied foam panels of the form wall assembly are movable between an extended position where the foam panels are spaced-apart to make the form and a collapsed position where the foam panels are brought close to each other for transportation purposes. Advantageously, a wall form made using such connectors can be pre-assembled at the factory and is as easy to ship to the site of construction as disassembled wall forms.

20 Claims, 12 Drawing Sheets

CONCRETE WALL FORM AND CONNECTORS THEREFOR

RELATED APPLICATION

The present application is a continuation-in-part of U.S. patent application Ser. No. 09/518,630 filed Mar. 3, 2000, still pending, which is a continuation-in-part of U.S. patent application Ser. No. 09/293,152, filed Apr. 16, 1999 now patented as U.S. Pat. No. 6,230,462.

FIELD OF THE INVENTION

The present invention relates generally to wall forms of the type comprising pairs of opposed form walls each formed of a plurality of stacked rows of plastic foam panels for receiving flowable materials such as concrete. More particularly, it relates to connectors used to maintain said form walls in spaced and parallel relationship.

BACKGROUND OF THE INVENTION

A number of different systems and methods currently exist for making insulating forms for casting a concrete wall. Often, these systems comprise pairs of opposed foam panels generally made of a rigid foam like polystyrene which define concrete-receiving cavities therebetween. Once the concrete is solidified, the form walls remain in place to insulate the wall. Those form walls are typically maintained in spaced and parallel relationship before the pouring of concrete by means of connectors comprising a pair of parallel lateral attachment flanges each embedded in one of the two opposed foam panels, and a connecting web interconnecting the flanges.

Known concrete forms with the desirable rigidity are conventionally manufactured in the factory and are then shipped on the site of construction to be installed onto the ground to be treated with the inherent risk of damage during transportation or installation, particularly, since known pre-assembled form walls are fragile due to the important empty volume existing between the form walls.

In other conventional methods, forms satisfying the requirements of rigidity are installed directly on the site. However, they are complex and expensive, since the numerous components of the latter forms render assembly time consuming.

The following documents disclose examples of different prior art concrete forming systems: U.S. Pat. Nos. 5,459,971; 5,625,989; 5,709,060; 5,704,180; 5,701,710; 4,730,422; 5,065,561; 5,740,648; 5,657,600.

There is still presently a need for a wall form that will be easy to handle, to ship and to install on the site of construction and that will be low in cost.

SUMMARY OF THE INVENTION

An object of the present invention is to propose a wall form assembly that will satisfy the above-mentioned need, and more particularly to propose connectors therefor which overcome the drawbacks of the presently available methods and apparatus for making wall forms.

A further object is to provide a wall form which can be completely pre-assembled at the factory and which is as easy to transport to the site of construction as disassembled prior art wall forms.

In accordance with the present invention, these objects are achieved with a connector for tying together opposed foam panels in spaced and parallel relationship to make a form for receiving flowable material. The connector comprises a pair of anchor members, one being devised to be embedded in one of the foam panels and the other being devised to be embedded in the other one of the foam panels. Each anchor member has an elongated flange plate for extending longitudinally and deep inside the foam panel and an elongated link element connected longitudinally to the flange plate and having a projecting end devised to come out of the foam panel once the anchor member is embedded therein. The connector further comprises a web member for extending between the foam panels, the web member having opposite longitudinal side ends, each of the side ends being hingedly connectable to the projecting end of either one of the anchor members, whereby the foam panels are tied together by connecting one side end of the web member to the projecting end of one of the anchor members and the other side end of the web member to the projecting end of the other anchor member. Thus, the tied foam panels are movable between an extended position where the foam panels are spaced-apart to make the form and a collapsed position where the foam panels are brought close to each other.

Preferably, the projecting end of each anchor member comprises a stabilising plate parallel to the flange plate for extending flush with an inner surface of the foam panel.

In a first preferred embodiment, a plurality of aligned open slotted tube-like knuckles are disposed on the stabilising plate. Each tube-like knuckle forms an inner tube having a pair of longitudinal opposed edge portions defining a slot in registry with the slots of the other knuckles. In this case, each longitudinal side end of the web member defines an enlarged end portion sized to be slidingly insertable in the open tube-like knuckles and a strip portion connecting the enlarged end portion to a central portion of the web member. The strip portion has a width sized so the strip portion is slidingly insertable in the slots of the anchor members and includes a plurality of aligned slits each adapted to receive an edge portion of the knuckles, thereby allowing the web member and the anchor member to pivot with respect to each other.

In a second preferred embodiment, the projecting end of each anchor member has a plurality of connecting elements disposed on the stabilising plate. Each connecting element comprises a longitudinally extending pivot pin. The web member has opposite longitudinal side ends, each of the longitudinal side ends defines a plurality of arms cooperating with each of the connecting elements, each arm having an extremity pivotally connected to the pivot pin of a corresponding connecting element so as to be rotatable around an axis defined by said pivot pin, thereby allowing the web member and anchor member to pivot with respect to each other.

The present invention is also directed to a wall form assembly comprising opposed foam panels disposed in spaced and parallel relationship to make a form for receiving a flowable material such as concrete and a plurality of connectors as described above tying the opposed foam panels together. More particularly, the form wall assembly comprises:

a first and a second opposed foam panels in spaced and parallel relationship; and
a plurality of connectors tying together the first and second foam panels, each connector comprising:
a pair of anchor members, a first one embedded in the first foam panel and the second one embedded in the second foam panel, each anchor member having:
an elongated flange plate extending longitudinally and deep inside the foam panel; and an elongated link element connected longitudinally to the flange plate and having a projecting end coming out of the foam panel, and a web member extending between said foam panels, the web member having a first longitudinal side end opposite a second longitudinal side end, said first longitudinal side end being hingedly connected to the projecting end of the first anchor member and the second longitudinal side end being hingedly connected to the projecting end of the second web member;

whereby the tied foam panels are movable between an extended position where the foam panels are spaced-apart to make the form and a collapsed position where the foam panels are brought close to each other.

A wall form assembly according to the present invention can be easily manufactured, compacted and stored without requiring a lot of space or transported to the site of construction. Due to the relatively light weight of the material used for the manufacture of the elements of the wall form assembly and due to the fact that these elements can be packed in a compact form, a wall form assembly according to the present invention is a lot less fragile during shipping than prior art pre-assembled wall forms, the freight costs for transportation are significantly reduced and the time required to install the form on the site is also significantly reduced as the form is already assembled.

Other features and objects of the present invention will become more apparent from the description that follows of preferred embodiments thereof, having reference to the appended drawings and given as examples only as to how the invention may be put into practice.

DESCRIPTION OF A PREFERRED EMBODIMENT

Figure 1:
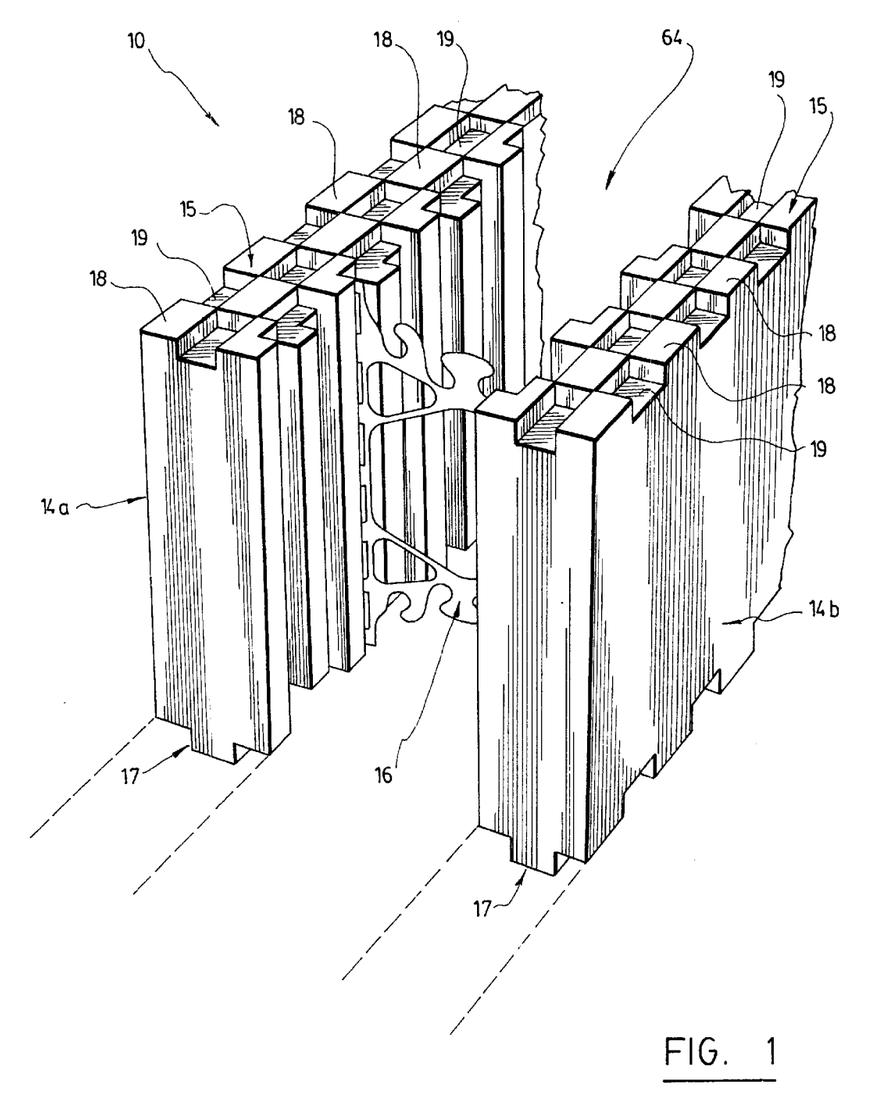
FIG. 1 is a perspective fragmentary view of a form wall assembly according to a first preferred embodiment of the present invention.
Figure 3:
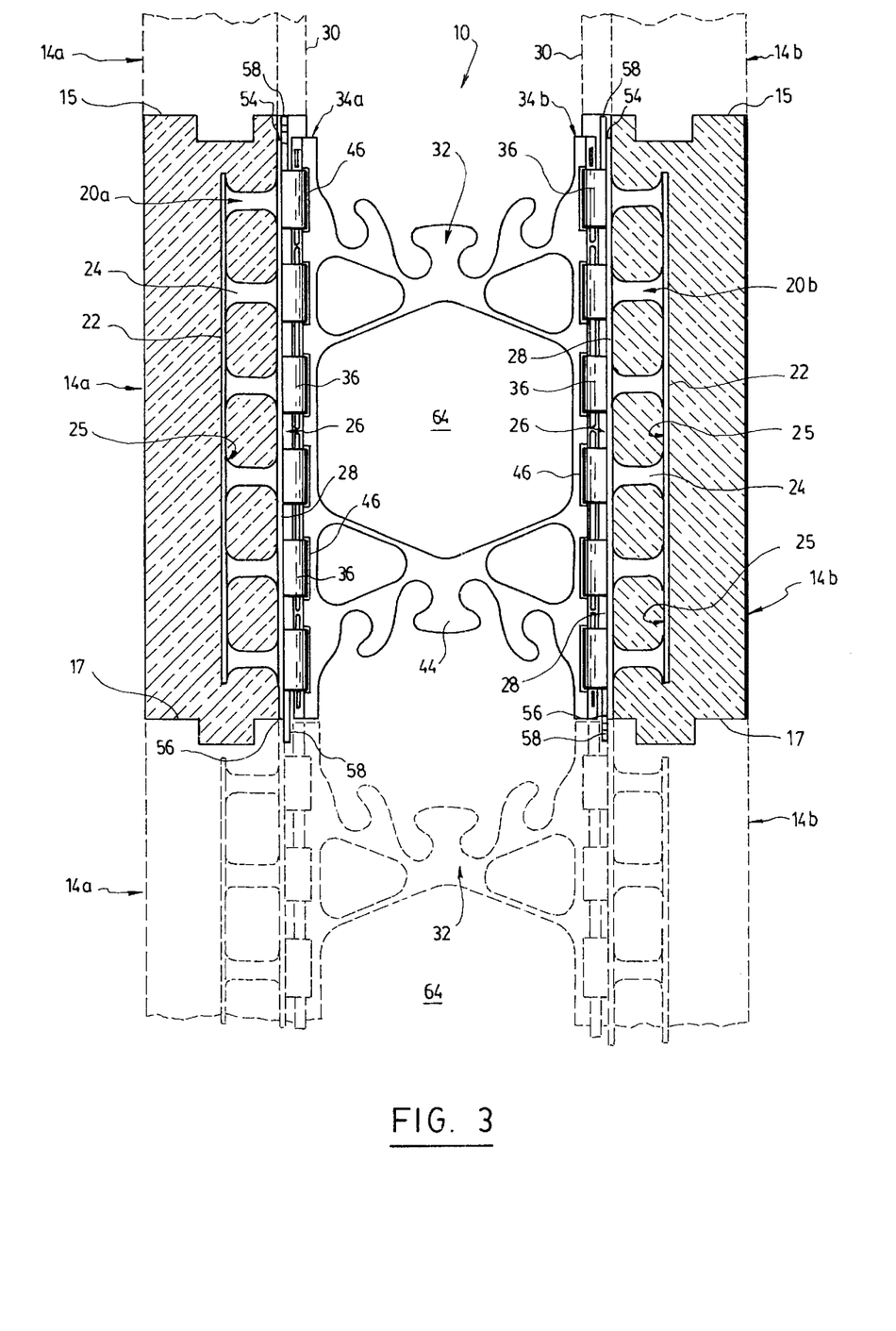
FIG. 3 is a cross-sectional side elevational view of the form wall assembly of FIG. 1 showing also an upper and a lower row of stacked foam panels.
Figure 5:
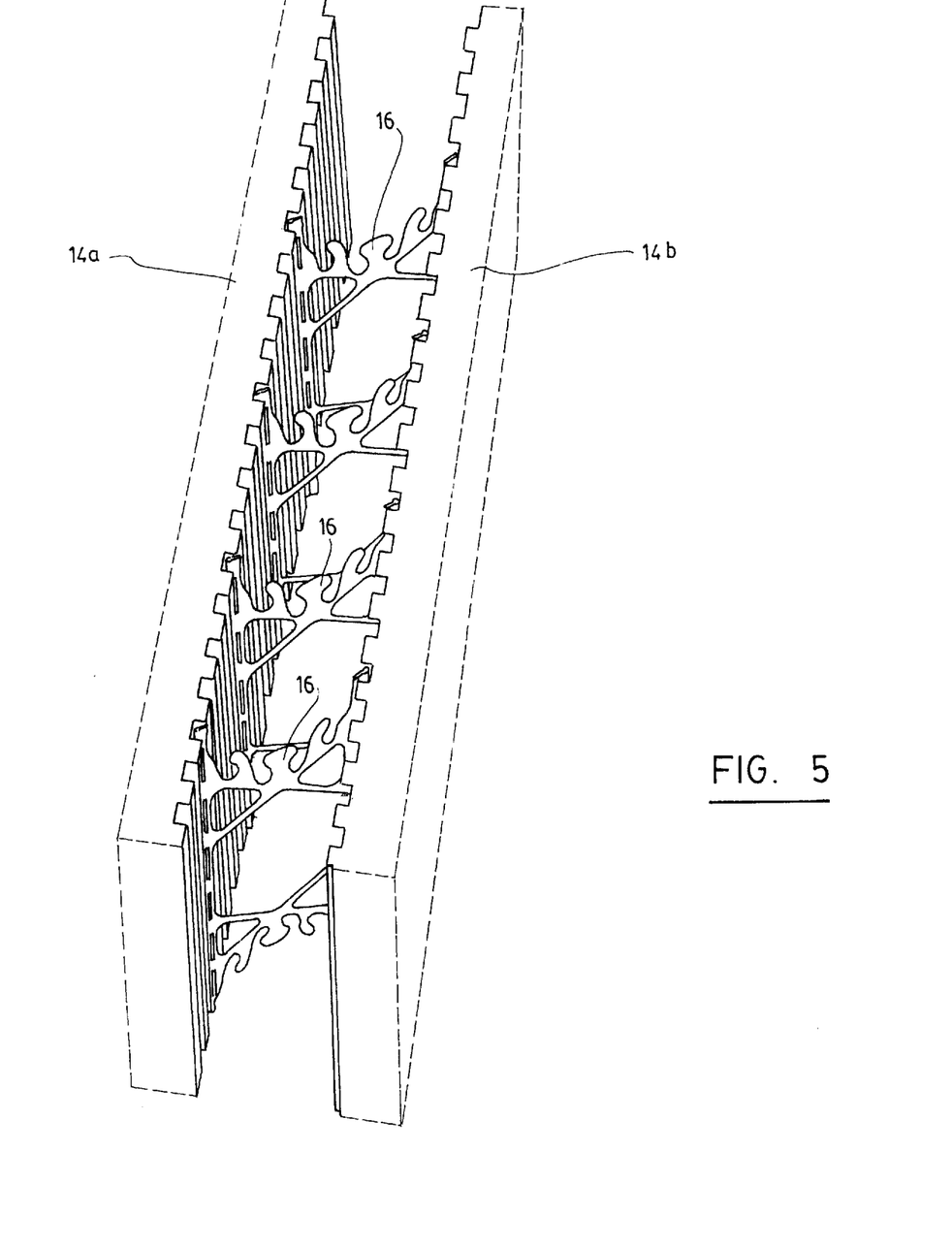
FIG. 5 is a perspective view of a pre-assembled form wall assembly substantially similar to the form wall assembly of FIGS. 1 and 3, and showing the foam panels in an extended position.

Referring to FIG. 1, a form wall assembly (10) according to the present invention is suitable to make a form for receiving flowable material such as concrete. The form obtained is of the type comprising a plurality of stacked horizontal rows of coplanar substantially rectangular foamed plastic panels (14) abutting one another along horizontal and vertical edges thereof, as shown in FIG. 3. More particularly, the form wall assembly (10) comprises a first foam panel (14a) opposed to a second foam panel (14b) in spaced and parallel relationship, and tied together by means of a plurality of connectors (16), as best seen in FIG. 5.

Figure 2:
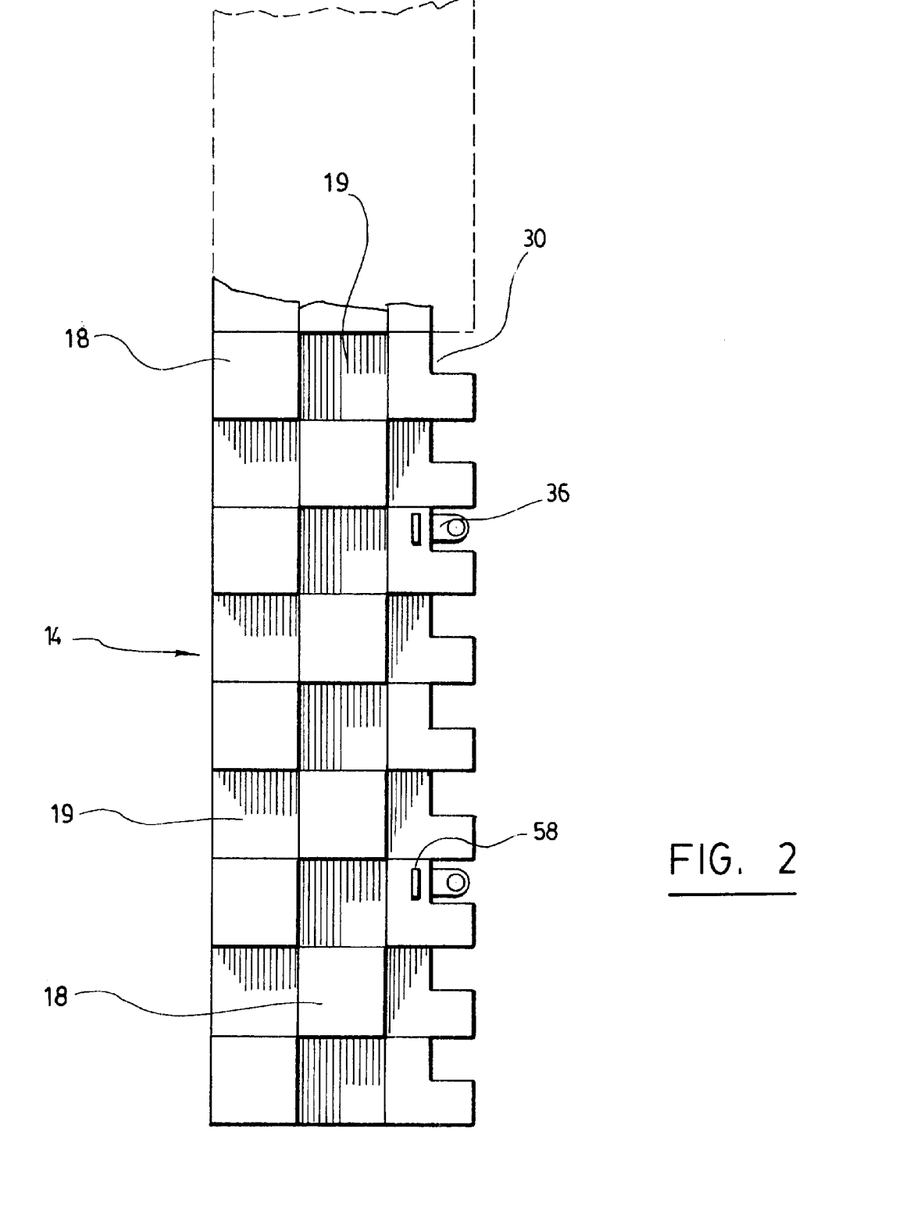
FIG. 2 is a top view of the left side foam panel of the form wall assembly of FIG. 1 showing the relief of the top surface of the foam panel.

The foam panels (14) each have a top surface (15) opposite a bottom surface (17) and, as illustrated in FIGS. 1 and 2, each of the top surface (15) and the bottom surface (17) have a checkerboard-type relief including alternating protrusions (18) and cavities (19). The checkerboard-type relief of the top surface (15) is in mirror symmetry with the checkerboard-type relief of the bottom surface (17) such that the top surface (15) is adapted to fit together with the bottom surface (17) of an upwardly adjacent similar foam panel (14), as shown in FIG. 5, and the bottom surface (17) is adapted to fit together with a downwardly adjacent similar foam panel (14).

Figure 4:
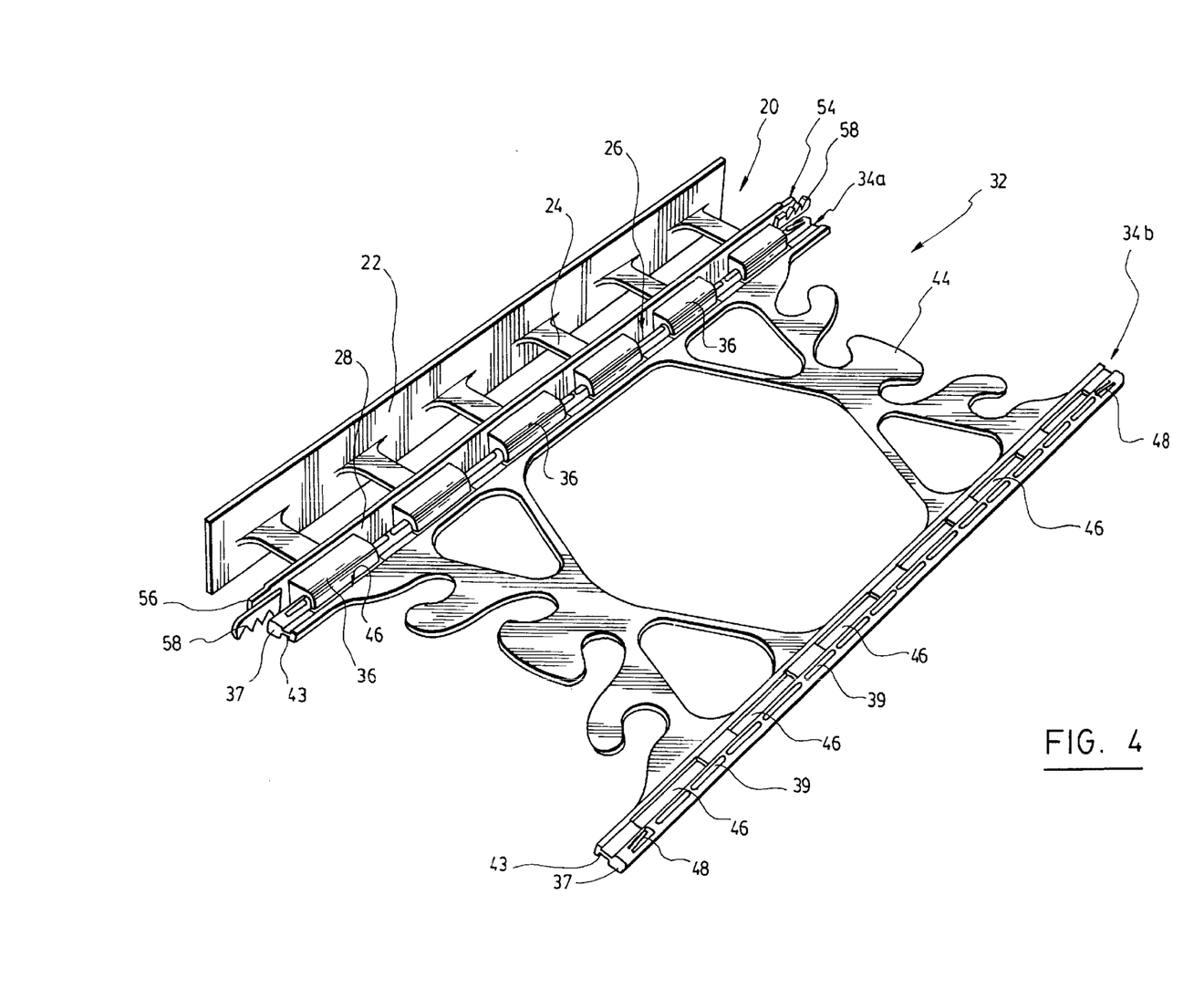
FIG. 4 is a perspective view of the connector shown in FIG. 3 without its right anchor member.

Referring now to FIGS. 3 and 4, each connector (16) comprises a pair of anchor members (20a, 20b), a first one (20a) embedded in the first foam panel (14a) and the second one (20b) embedded in the second foam panel (14b).

Each anchor member (20) has an elongated flange plate (22) extending longitudinally and deep inside the foam panel (14) and an elongated link element (24) connected longitudinally to the flange plate (22) and having a projecting end (26) coming out of the foam panel (14). Preferably, the projecting end (26) of each anchor member (20) comprises a stabilising plate (28) parallel to the flange plate (22) and extending flush with the inner surface (30) of the foam panel (14).

In order to lighten the foam panel assembly, the link element (24) comprises a plurality of holes (25) therealong. However, the link element might have been solid.

It has to be noted that by saying that the anchor member is embedded in the foam panel, a person in the art will understand that in the making of the foam panel (14) in the manufacturing plant, the plastic foam material forming the panel (14) is injected to surround the anchor member (20), thereby strengthening the joint between the panel (14) and the anchor member (20) which thus act as an anchor forming part of the foam panel (14). More specifically and as best seen in FIG. 3, the plastic foam material, which is preferably a polystyrene, is injected to surround the anchor member (20) such that the stabilising plate (28) of the anchor member (20) is flush with the inner surface (30) of the foam panel (14).

Figure 6:
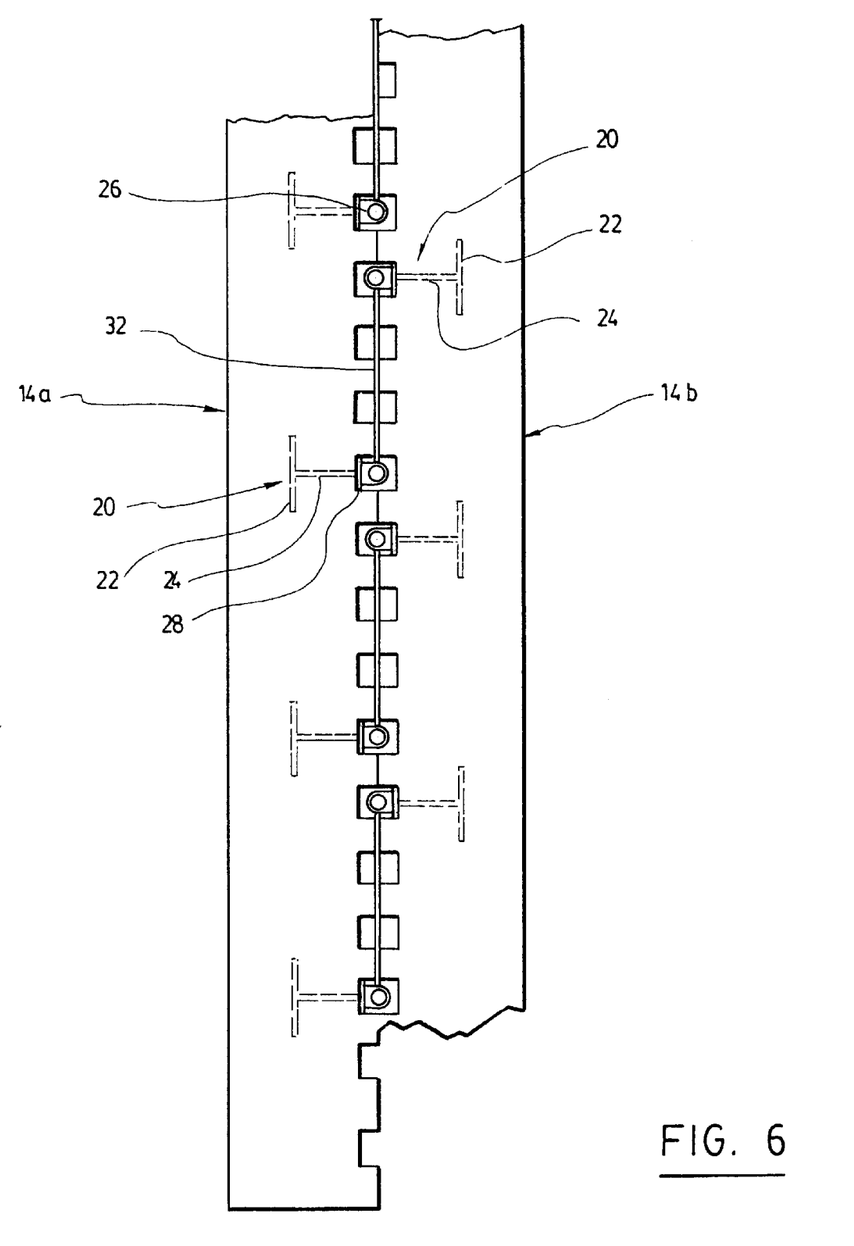
FIG. 6 is a top view of the form wall assembly of FIG. 5 showing the panels folded on each other for transportation purposes.
Figure 7:
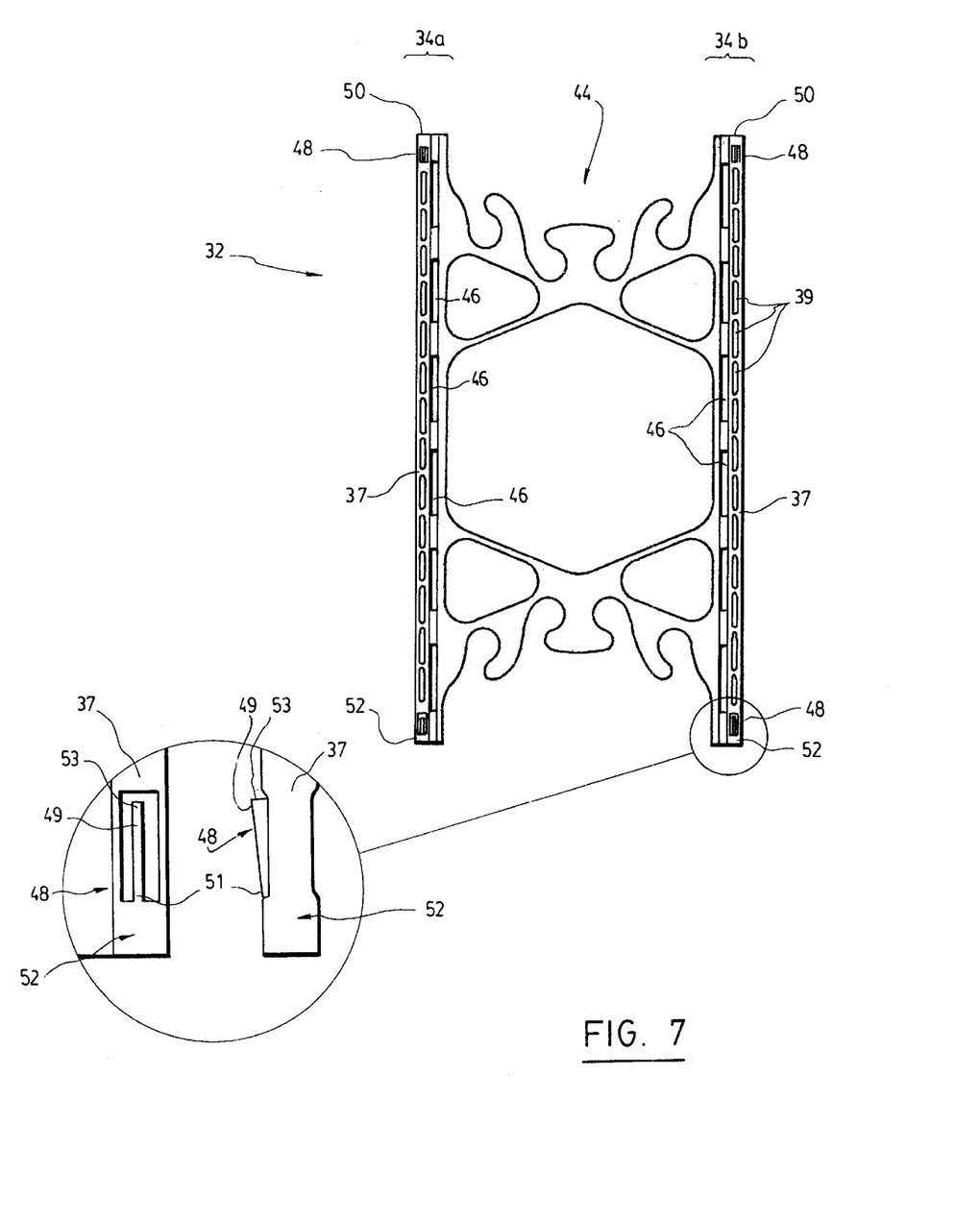
FIG. 7 is a side elevation view of the web member of the connector of FIG. 1.

Referring also to FIG. 7, the connector (16) further comprises a web member (32) extending between the foam panels (14). The web member (32) which is preferably made of a relatively flexible plastic comprises a central portion (44) having a shape adapted to receive and hold metal rods used to reinforce the concrete. The web member (32) further has a first longitudinal side end (34a) hingedly connected to the projecting end (26) of the first anchor member (20a) and a second longitudinal side end (34b) opposed to the first longitudinal side end (34a). The second longitudinal side end (34b) is hingedly connected to the projecting end (26) of the second web member (20b). The foam panels (14) are movable between an extended position, as shown in FIG. 5, where the foam panels (14) are spaced-apart to make the form and a collapsed position, as shown in FIG. 6, where the foam panels (14) are brought close to each other.

Figure 9A:
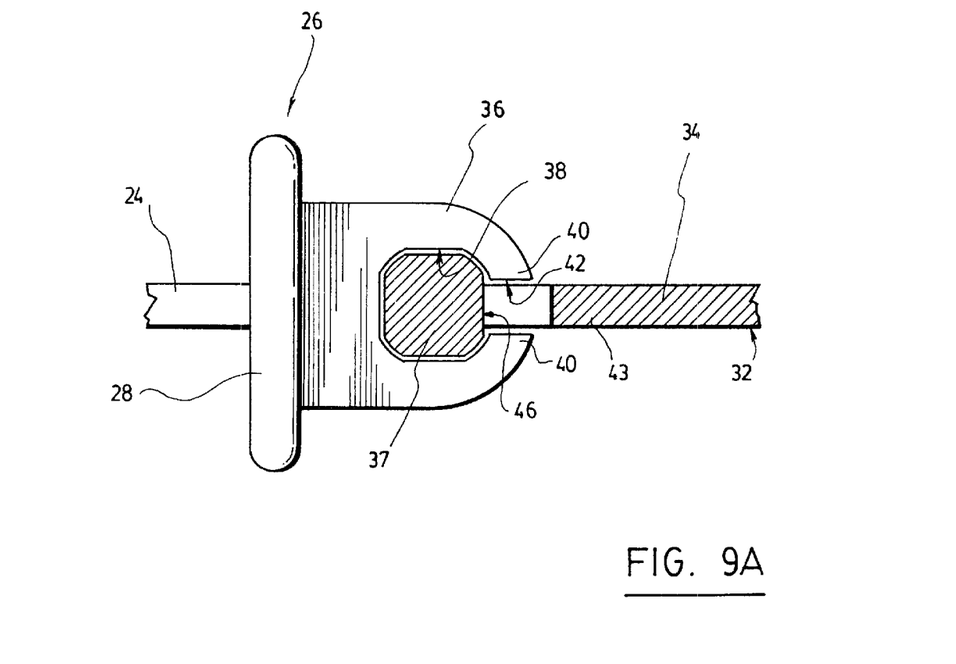
FIG. 9A is an enlarged top view of a joint between a web member and an anchor member in an extended position.
Figure 9B:
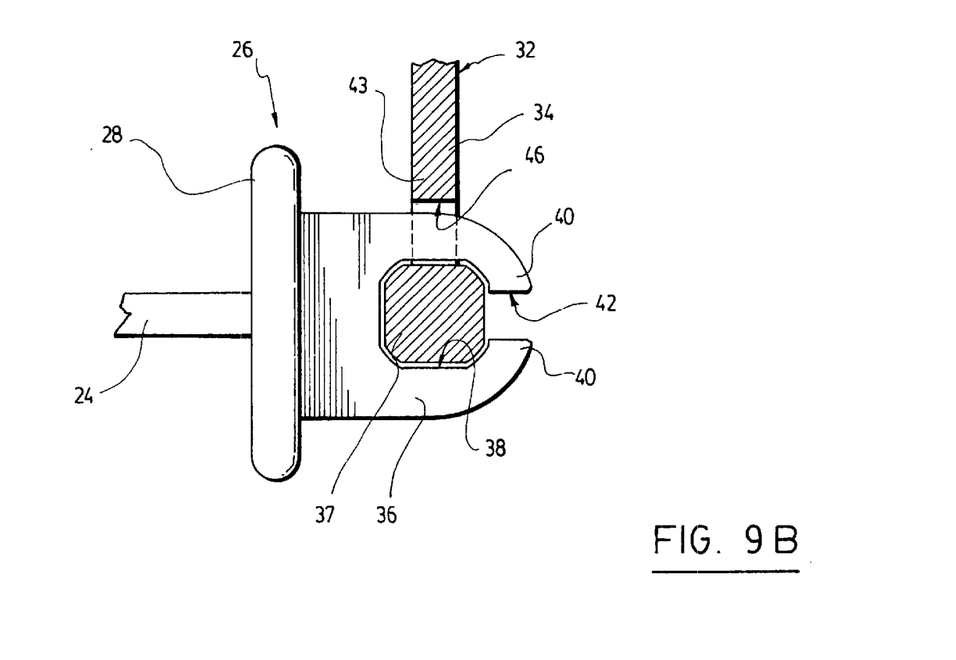
FIG. 9B is the same view as in FIG. 9A showing the joint in a compacted position.

According to a first preferred embodiment of the invention, in order to hingedly connect the web member (32) to the anchor members (20), the connector (16) preferably comprises a plurality of aligned open slotted tube-like knuckles (36) positioned on the stabilising plate (28), as shown in FIG. 4, which hingedly cooperate with an enlarged end portion (37) of the web member (32). As best seen in FIGS. 9A and 9B, each tube-like knuckle (36) forms an inner tube (38) having a pair of longitudinal opposed edge portions (40) defining a slot (42) in registry with the slots of the other knuckles, as shown in FIG. 4. Each longitudinal side end (34) of the web member (32) defines the enlarged end portion (37) which is sized to be slidingly insertable in the open tube-like knuckles (36). Referring to FIGS. 9A and 9B, each longitudinal side end (34) of the web member (32) further defines a strip portion (43) connecting the enlarged end portion (37) to a central portion (44) of the web member (32). The width of the strip portion (43) is such that the strip portion (43) is slidingly insertable in the slots (42) of the anchor members (20). As best seen in FIG. 4 or 7, the strip portion (43) also includes a plurality of aligned slits (46) each adapted to receive an edge portion (40) of the knuckles (36) to thereby allow the web member (32) and the anchor member (20) to pivot with respect to each other, as shown in FIGS. 9A and 9B. Preferably, the enlarged end portion (37) is also provided therealong with a plurality of small holes (39) to lighten the web member (32). As can be appreciated, the preferred embodiment of the present invention illustrated comprises six of those knuckles (36) on each anchor member (20) having six corresponding slits (46) provided on the web member (32). Another embodiment of the present invention may have a different number of those knuckles and slits.

Figure 8:
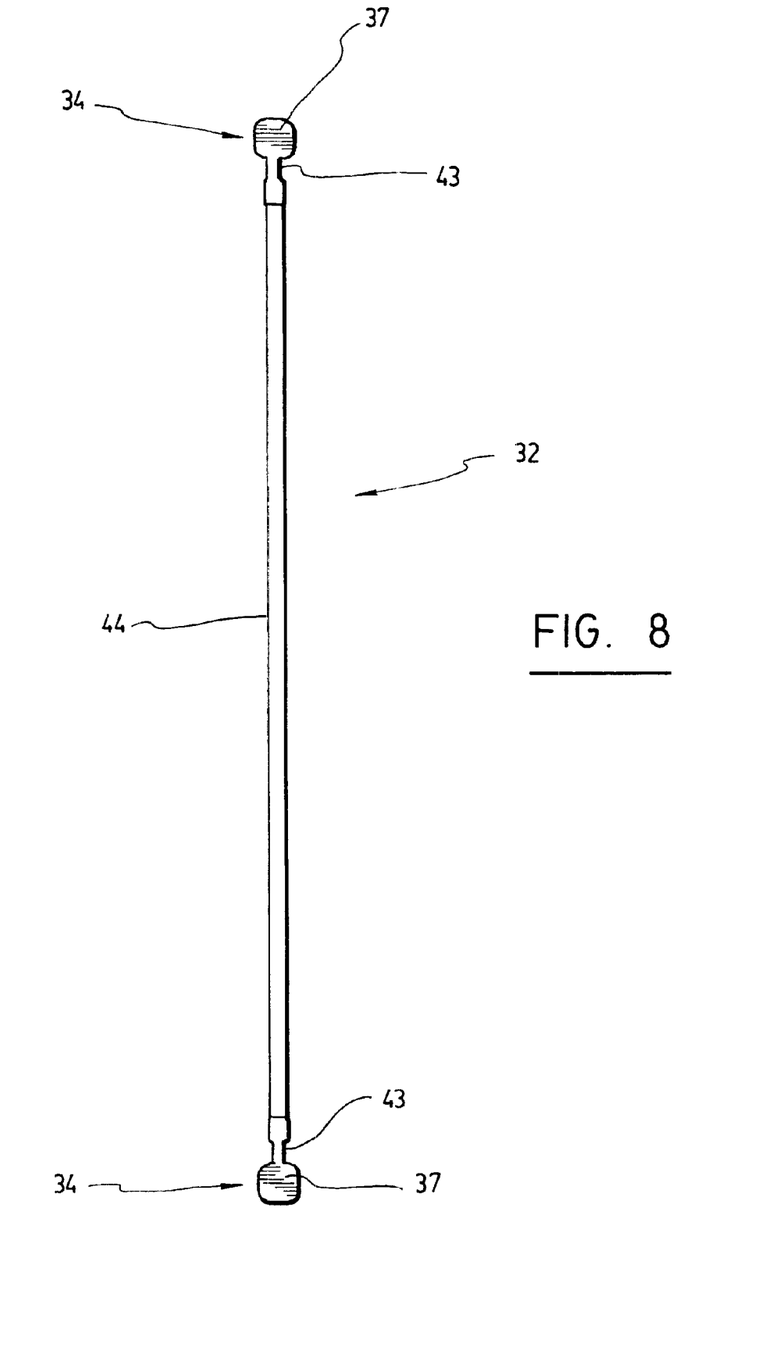
FIG. 8 is a top view of the web member of FIG. 7.

The inner tube (38) and the enlarged end portion (37) may have a circular shape. However, as illustrated in FIGS. 8, 9A and 9B, in order to prevent the panels (14) from moving like a jumping jack during the shipping or the installation on the site, the inner tube (38) and the enlarged end portion (37), which are preferably made of a slightly flexible plastic, preferably have a shape which allows those elements to be somewhat locked in the extended or collapsed position. More preferably, the inner tube (38) and the enlarged end portion (37) both have a rectangular section with rounded corners. As can be appreciated, that particular shape prevents the enlarged end portion (37) from pivoting freely in the inner tube (38) of the knuckle (36). Therefore, a certain force has to be applied to the assembly to bring it from the collapsed position, as in FIG. 6, to the extended position, as in FIG. 1 or 5, or vice versa.

Referring more particularly to FIG. 7, the connector (16) preferably comprises a stopper (48) to prevent the web member (32) from sliding out upwardly or downwardly of the knuckles (36) of the anchor member (20). More preferably, each enlarged end portion (37) of the web member (32) has an upper extremity portion (50) and a lower extremity portion (52) both comprising a biasing stopper (48) to prevent the side end (34) from sliding out of the tube-like knuckles (36) once inserted therein. The biasing stopper (48) comprises an elongated leaf element (49) with a first end (51) secured to the extremity portion (52) and a free second end (53) pointing opposite the extremity (52). The leaf element (49) is pivotable around the first end (51) thereof between a compressed position where the leaf element (49) is brought close along the outer surface of the enlarged portion (37) to let the knuckles (36) of an anchor member (20) slide over and a relaxed position, as shown in FIG. 7, where the second end (53) biases away from the outer surface of the enlarged portion (37) to prevent the knuckles (36) from coming out.

Figure 11:
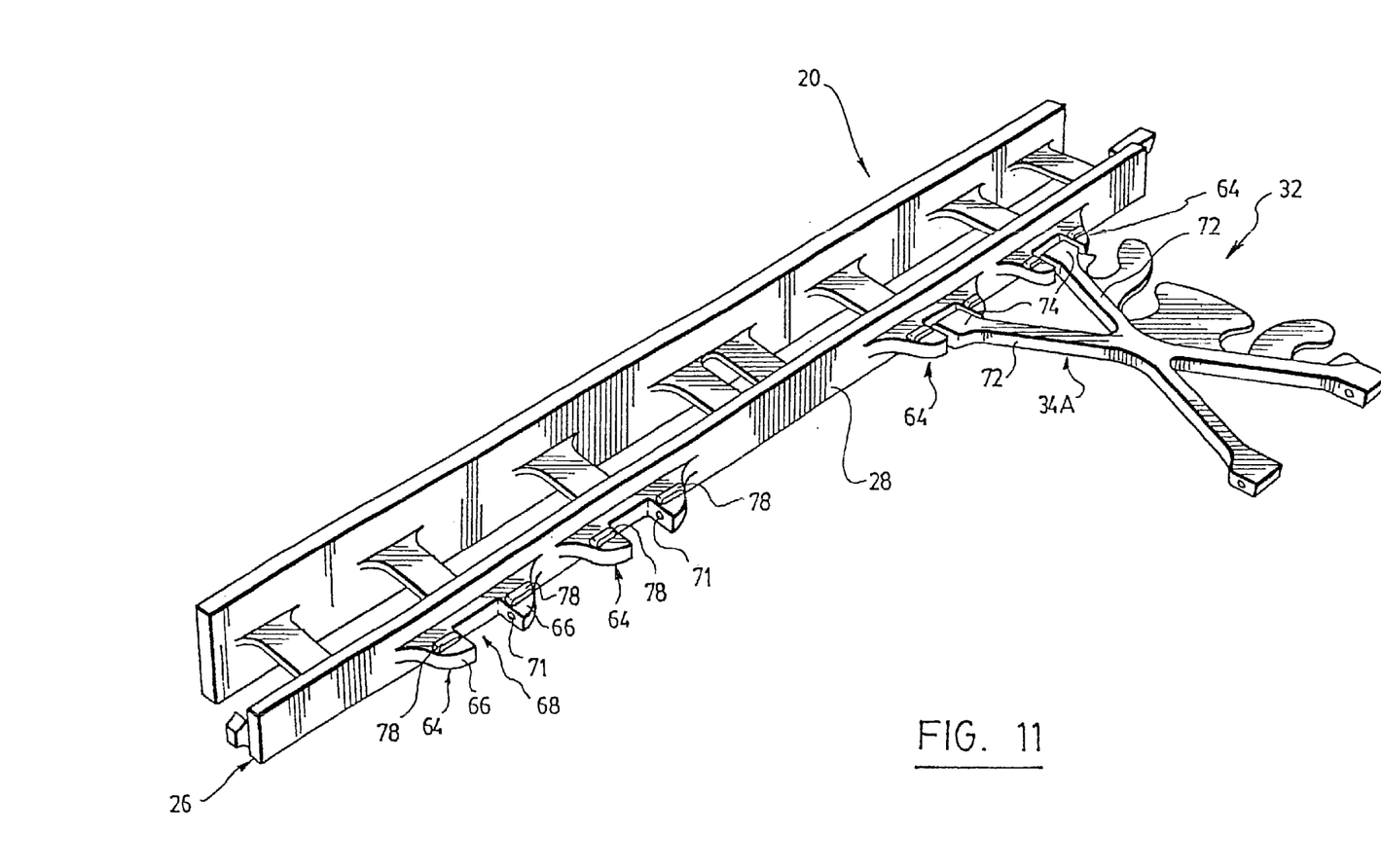
FIG. 11 is a perspective view of a connector according to a second preferred embodiment of the invention, shown without its right anchor member and a portion of the web member.
Figure 12:
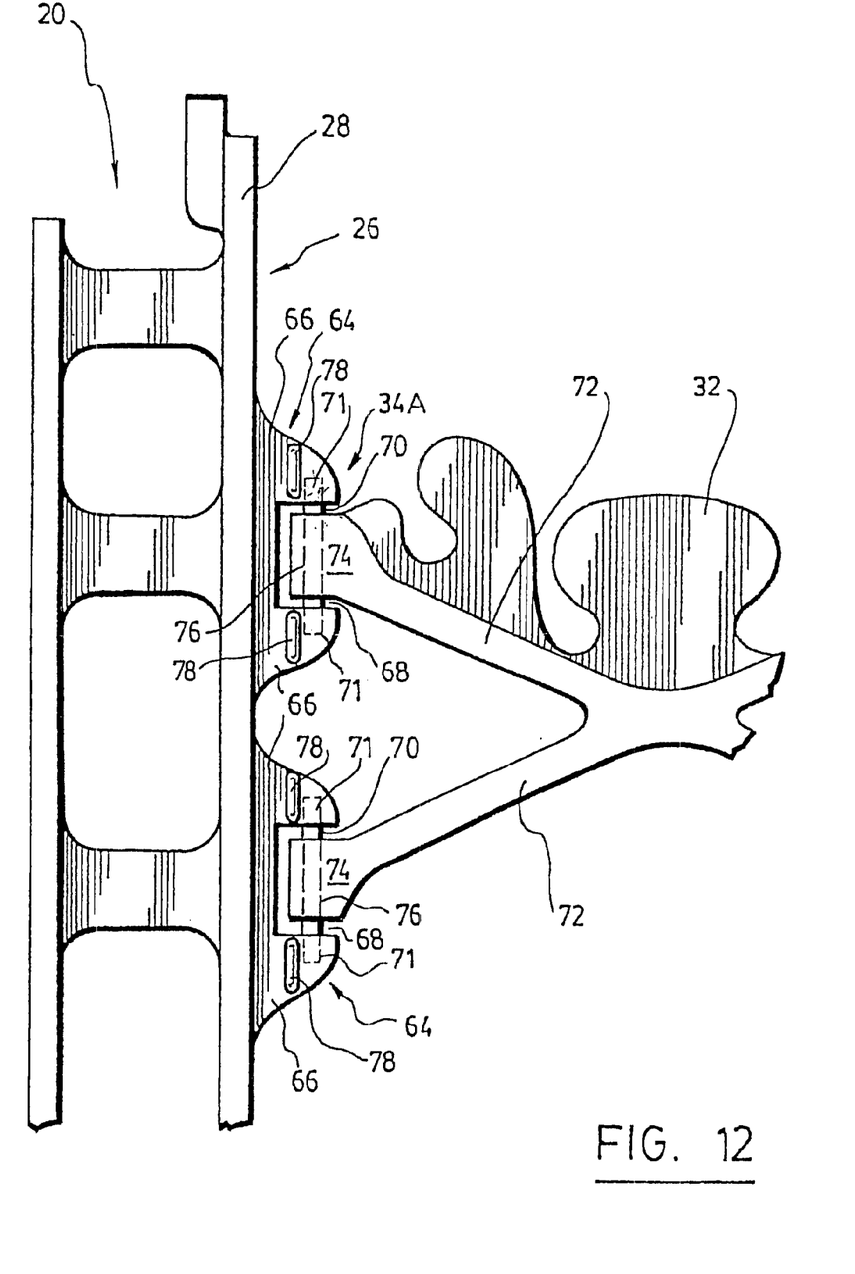
FIG. 12 is a side elevation view in partial transparency of a portion of the connector of FIG. 11

Referring to FIGS. 11 and 12, an alternative manner to hingedly connect the web member (32) to the anchor members (20) is illustrated. In accordance with this second embodiment, a plurality of connecting elements (64) are disposed on the stabilising plate (28) of the projecting end (26) of each anchor member (20). Each of these connecting elements (64) is shaped to form two aligned ridges (66) projecting from the stabilising plate (28), and the space between them defines a longitudinal sleeve (68). A joining pin (70), also referred as a pivot pin, is mounted in the sleeve (68) between the two ridges (66). Preferably, pin receiving holes (71) are provided in the ridges (66) for this purpose, each hole (71) facing inwardly of the sleeve (68).

To cooperate with the connecting elements (64), each longitudinal side end (34a, 34b) of the web member (32) defines a corresponding number of arms (72). Each arm (72) has an extremity (74) connectable to a corresponding pivot pin (70) so as to be rotatable around an axis defined by the pivot pin (70). It can be easily seen that this purpose may be achieved by either mounting the extremity (74) of the arm (72) rotatably around the pivot pin (70), or mounting the pivot pin (70) itself rotatably in the pin receiving holes (71). Preferably, the extremity (74) of each arm (72) is provided with a bore (76) for receiving one of the pins (70).

In the preferred embodiment illustrated in FIGS. 11 and 12, each pivot pin (70) is a short rod preferably made of a metallic material, most preferably it is made of steel. Also preferably, the web member (32) and the anchor members (20) are made of rigid plastic.

Although there exist other ways of manufacturing the connector (16) shown in FIGS. 11 and 12, one of the preferred ways is to use plastic molding in different stages. For example, in a first stage, the anchor members (20) with the pivot pins (70) are molded by conventional plastic molding and using an appropriate mold. Then, in a second stage, the web member (32) is molded with a mold designed so that each arm (72) of the web member (32) surrounds a respective pivot pin (70). Once all the plastics parts of the connector (16) are stiffen, the web member (32) can be rotated around the pivot pins (70). Alternatively, the web member (32) could be first molded with the pivot pins (70), and then, in a second stage, the anchor member (20) is molded in a mold designed so to form the ridges (66) at the extremities of each pivot pin (70). Obviously, in these particular cases, the pivot pin (70) is made of any hard material having a greater melting temperature than that of the plastic used to form the other parts. Therefore during all the process of plastic molding, the pivot pins (70) remain in a solid state.

The connection between the connecting elements (64) and the web member (32) is permanent once it has been formed by plastic molding.

Although the pivot pins (70) could be made of a plastic having a greater melting point than that of the plastic used for the web member (32) and the anchor members (20), they are preferably made of a metallic material, most preferably, it is made of steel.

To sum up, a person skilled in the art would readily understand that the connecting elements (64) may be formed directly by molding during manufacturing of the anchor member (20). In the illustrated embodiment of FIGS. 11 and 12, a protrusion (78) is generated by the molding process on each side of the ridges (66). In the case of corners of a wall where adjacent panels are mounted perpendicularly to each other and where obviously no web member is provided with the connectors, these protrusions, which are embedded in the concrete with the ridges, have the additional advantage of serving as anchor means for the flanges of the connector in which screws could be inserted to fix, for example, a plasterboard wall thereto.

Another way of mounting the pivot pin (70) through the bore (76) of an arm (72) and between two ridges (66) would be to use a telescopic pivot pin such as the one commonly used for connecting the strap of a watch to its casing.

Figure 10A:
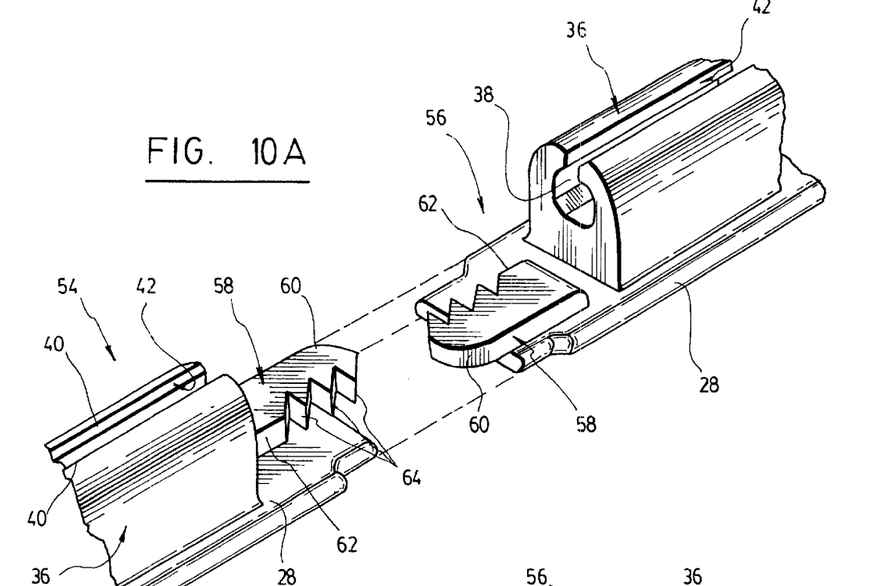
FIG. 10A is a perspective view of two mating anchor members showing the fastener provided at the end portion of the stabilising plate.
Figure 10B:
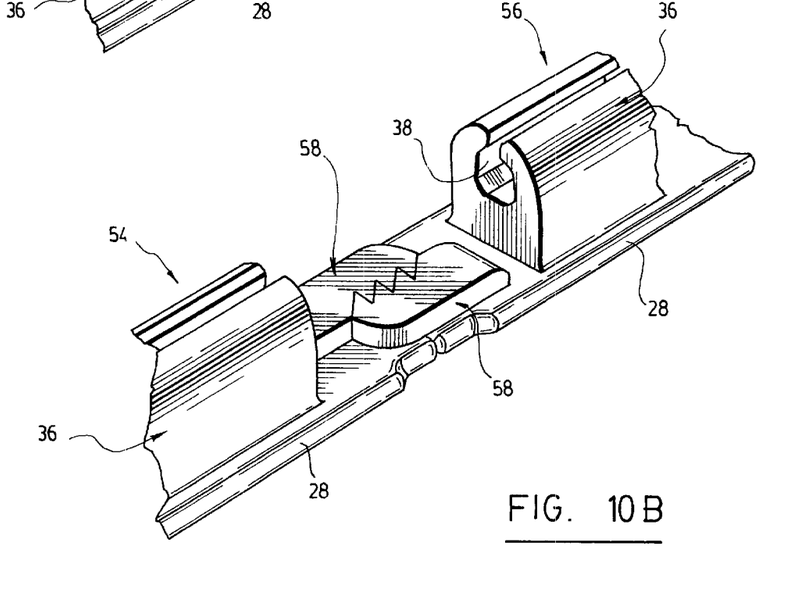
FIG. 10B is the same view as FIG. 10A showing the two anchor members linked together.

Referring to FIGS. 3, 4, 10A and 10B, the stabilising plate (28) of each anchor member (20) preferably comprises an upper end (54) and a lower end (56) both comprising a fastener (58) to link the anchor member (20) to a mating anchor member (20), as best seen in FIGS. 10A and 10B. More preferably, the fastener (58) is a grapnel-type fastener molded on the stabilising plate (28) with an extremity (60) projecting from the corresponding end of the stabilising plate (28). As best seen in FIGS. 10A and 10B, the fastener (58) of the upper end (54) of a single stabilising plate (28) is in mirror symmetry with the fastener (58) of the lower end (56) of that stabilising plate (28) and comprises a side (62) provided with three pointed teeth (64) adapted to link with the pointed teeth (64) of a mating anchor member (20). Of course, although three pointed teeth (64) are shown here, any other number of such teeth (64) could be provided as needed, Advantageously, a plurality of teeth (64) is provided to allow an adjustment of the mating between adjoining anchor members (20) by selecting a particular teeth (64) on each fastener (58) for linking with the opposed fastener (58).

Therefore, thanks to both the checkerboard-type relief of the top and bottom surfaces of the panels (14) and the fasteners (58), the wall form assemblies according to the illustrated preferred embodiment of the present invention can be easily stacked over each other and linked together, as shown in FIG. 3.

Referring more particularly to FIG. 1, each fastener (58) of a foam panel (14) is preferably sized so the extremity (60) thereof is flush with either the top surface (15) or the bottom surface (17) of the foam panel (14) to prevent that fastener (58) from being in the way.

As can be appreciated from FIGS. 5 and 6, thanks to the specific characteristics of the connector (18) according to the present invention, the panels (14) once tied with the help of those connectors (18) are easily foldable with respect to one another and thus can be shipped to the site of construction in a well compacted form.

Once a form for receiving flowable material is mounted using a plurality of stacked horizontal rows of form wall assemblies, the empty cavity (64) existing between the form wall made of isolating and rigid panels (14) is filled with concrete or with cement based grout. After hardening of the filling material, a composite wall is obtained with the isolating panels firmly attached through the connectors to the concrete inside-wall.

Although preferred embodiments of the invention have been described in detail herein and illustrated in the accompanying drawings, it is to be understood that the invention is not limited to those precise embodiments and that various changes and modifications may be effected therein without departing from the scope or spirit of the invention.

What is claimed is:

1. A connector for tying together opposed foam panels in spaced and parallel relationship to make a form for receiving flowable material, the connector comprising:
   a pair of anchor members, one being devised to be embedded in one of said foam panels and the other being devised to be embedded in the other one of said foam panels, each anchor member having:
      an elongated flange plate for extending longitudinally and deep inside the foam panel; and
      an elongated link element connected longitudinally to the flange plate and having a projecting end devised to come out of the foam panel once the anchor member is embedded therein, the projecting end comprising:
         a stabilising plate parallel to the flange plate for extending flush with an inner surface of the foam panel;
         a plurality of connecting elements projecting from the stabilising plate, each connecting element comprising a longitudinally extending pivot pin; and
   a web member for extending between said foam panels, the web member having opposite longitudinal side ends, each of said longitudinal side ends defining a plurality of arms cooperating with each of the connecting elements, each arm having an extremity pivotally connected to the pivot pin of a corresponding connecting element so as to be rotatable around an axis defined by said pivot pin, thereby allowing the web member and anchor member to pivot with respect to each other.

2. A connector as claimed in claim 1, wherein each connecting element comprises two aligned and spaced ridges between which the pivot pin of the respective connecting element is extending.

3. A connector as claimed in claim 1, wherein the extremity of each arm of the longitudinal side end of the web member has a bore therein in which the pivot pin is extending.

4. A connector as claimed in claim 1, wherein the stabilising plate of each anchor member comprises an upper end and a lower end both comprising a fastener to link the anchor member to a mating anchor member.

5. A connector as claimed in claim 4, wherein each of said fasteners is a grapnel-type fastener projecting from the respective end of the stabilising plate.

6. A connector as claimed in claim 5, wherein each of the grapnel-type fastener comprises a side provided with three pointed teeth adapted to link with the pointed teeth of a mating anchor member.

7. A connector as claimed in claim 6, wherein the grapnel-type fastener of the upper end of the stabilising plate is in mirror symmetry with the grapnel-type fastener of the lower end of the stabilising plate.

8. A form wall assembly to make a form for receiving flowable material, the form wall assembly comprising:
   a first and a second opposed foam panels in spaced and parallel relationship; and
   a plurality of connectors tying together said first and second foam panels, each connector comprising:
      a pair of anchor members, a first one embedded in the first foam panel and the second one embedded in the second foam panel, each anchor member having:
         an elongated flange plate extending longitudinally and deep inside the foam panel; and an elongated link element connected longitudinally to the flange plate and having a projecting end coming out of the foam panel, the projecting end comprising:
- a stabilising plate parallel to the flange plate and extending flush with an inner surface of the foam panel;
- a plurality of connecting elements projecting from the stabilising plate, each connecting element comprising a longitudinally extending pivot pin; and a web member extending between said foam panels, the web member having a first longitudinal side end opposite a second longitudinal side end, said first longitudinal side end being hingedly connected to the projecting end of the first anchor member and the second longitudinal side end being hingedly connected to the projecting end of the second web member; each of said longitudinal side ends defining a plurality of arms cooperating with each of the connecting elements, each arm having an extremity pivotally connected to the pivot pin of a corresponding connecting element so as to be rotatable around an axis defined by said pivot pin, thereby allowing the web member and anchor member to pivot with respect to each other; whereby the tied foam panels are movable between an extended position where the foam panels are spaced-apart to make the form and a collapsed position where the foam panels are brought close to each other.

9. A form wall assembly as claimed in claim 8, wherein each connecting element comprises two aligned and spaced ridges between which the pivot pin of the respective connecting element is extending.

10. A form wall assembly as claimed in claim 8, wherein the extremity of each arm of the longitudinal side end of the web member has a bore therein in which the pivot pin is extending.

11. A connector as claimed in claim 8, wherein the stabilising plate of each anchor member comprises an upper end and a lower end both comprising a fastener to link the anchor member to a mating anchor member.

12. A form wall assembly as claimed in claim 11, wherein each of said fasteners is a grapnel-type fastener having an extremity projecting from the respective end of the stabilising plate.

13. A form wall assembly as claimed in claim 12, wherein each foam panel has a top surface opposite a bottom surface, each of the top surface and the bottom surface having a checkerboard-type relief including alternating protrusions and cavities, the checkerboard-type relief of the top surface being in mirror symmetry with the checkerboard-type relief of the bottom surface such that the top surface is adapted to fit together with the bottom surface of an upwardly adjacent similar foam panel and the bottom surface is adapted to fit together with the top surface of a downwardly adjacent similar foam panel.

14. A form wall assembly as claimed in claim 13, wherein the extremity of each of the fasteners of a foam panel is flush with either the top surface or the bottom surface of the foam panel.

15. A form wall assembly as claimed in claim 14, wherein each of the grapnel-type fasteners comprises a side provided with three pointed teeth adapted to link with the pointed teeth of a mating anchor member.

16. A form for receiving flowable material comprising a plurality of stacked horizontal rows of form wall assemblies as defined in claim 8 in the extended position.

17. A connector as claimed in claim 1, wherein the pivot pin of each connecting element is made of a metallic material.

18. A connector as claimed in claim 17, wherein the metallic material is steel.

19. A form wall assembly as claimed in claim 8, wherein the pivot pin of each connecting element is made of a metallic material.

20. A form wall assembly as claimed in claim 19, wherein the metallic material is steel.

* * * * *